(12) United States Patent
Bhat

(10) Patent No.: US 12,395,590 B2
(45) Date of Patent: Aug. 19, 2025

(54) REDUCTION AND GEO-SPATIAL DISTRIBUTION OF TRAINING DATA FOR GEOLOCATION PREDICTION USING MACHINE LEARNING

(71) Applicant: NetScout Systems Texas, LLC, Plano, TX (US)

(72) Inventor: Sunil Bhat, Plano, TX (US)

(73) Assignee: NetScout Systems Texas, LLC, Westford, MA (US)

( * ) Notice: Subject to any disclaimer, the term of this patent is extended or adjusted under 35 U.S.C. 154(b) by 914 days.

(21) Appl. No.: 17/470,900

(22) Filed: Sep. 9, 2021

(65) Prior Publication Data

US 2023/0075690 A1 Mar. 9, 2023

(51) Int. Cl.
*G06N 20/00* (2019.01)
*H04M 15/00* (2006.01)
*H04W 4/029* (2018.01)
*H04W 64/00* (2009.01)

(52) U.S. Cl.
CPC ............ *H04M 15/41* (2013.01); *G06N 20/00* (2019.01); *H04W 4/029* (2018.02); *H04W 64/006* (2013.01)

(58) Field of Classification Search
CPC .. H04M 15/41; H04M 15/44; H04M 15/8033; H04M 15/8038; H04W 64/006; H04W 16/22; G06N 20/20; G06N 20/00
See application file for complete search history.

(56) References Cited

U.S. PATENT DOCUMENTS

| | | | |
|---|---|---|---|
| 8,532,668 B2 * | 9/2013 | Goldfarb | G01S 5/0294 |
| | | | 455/67.11 |
| 10,853,720 B1 * | 12/2020 | Calmon | G06Q 50/40 |
| 11,032,665 B1 * | 6/2021 | George | H04W 4/023 |

(Continued)

FOREIGN PATENT DOCUMENTS

JP 2005148846 A * 6/2005

OTHER PUBLICATIONS

A. B. Adege, H.-P. Lin and L.-C. Wang, "Mobility Predictions for IoT Devices Using Gated Recurrent Unit Network," in IEEE Internet of Things Journal, vol. 7, No. 1, pp. 505-517, Jan. 2020, doi: 10.1109/JIOT.2019.2948075. (Year: 2020).*

(Continued)

*Primary Examiner* — Michael J Huntley
*Assistant Examiner* — Jasmine Thanh Thai
(74) *Attorney, Agent, or Firm* — Foley & Lardner LLP

(57) ABSTRACT

A method is provided of limiting machine learning (ML) model training data, including receiving a maximum number of entries per grid box N. Grids are defined, each grid having grid boxes and covering a geographic area defined by a different cell list of a communication network, each grid box covering a different portion of the geographic area. Truth call records having truth data reporting geolocation (GL) data are selected from multiple received call records. A grid box is determined for each truth call record that covers a geographic area including the GL indicated by the truth call record's GL data. Truth call records are selectively assigned to their determined grid box in a fashion to not exceed the maximum number of entries per grid box N, and the truth data and signal detail data of only the assigned truth call records are output as the ML model training data.

17 Claims, 8 Drawing Sheets

(56) References Cited

U.S. PATENT DOCUMENTS

| | | | | |
|---|---|---|---|---|
| 2003/0222820 | A1* | 12/2003 | Karr | G01S 5/0009 |
| | | | | 342/457 |
| 2012/0052835 | A1* | 3/2012 | Bull | G01S 5/0278 |
| | | | | 455/456.1 |
| 2013/0040649 | A1* | 2/2013 | Soto Matamala | H04W 64/00 |
| | | | | 455/456.1 |
| 2014/0038634 | A1* | 2/2014 | Eskicioglu | H04W 36/322 |
| | | | | 455/456.1 |
| 2014/0222570 | A1* | 8/2014 | Devolites | H04W 4/02 |
| | | | | 705/14.58 |
| 2014/0228056 | A1* | 8/2014 | Busch | G06Q 30/0261 |
| | | | | 455/456.3 |
| 2015/0004999 | A1* | 1/2015 | Schuler | H04W 64/00 |
| | | | | 455/456.1 |
| 2015/0373501 | A1* | 12/2015 | Dribinski | H04W 4/029 |
| | | | | 455/456.1 |
| 2016/0021503 | A1* | 1/2016 | Tapia | H04W 24/02 |
| | | | | 455/456.1 |
| 2016/0021637 | A1* | 1/2016 | Cao | H04W 64/006 |
| | | | | 455/440 |
| 2017/0347231 | A1* | 11/2017 | Zhyshko | H04W 4/021 |
| 2018/0014161 | A1* | 1/2018 | Warren | G06F 16/24578 |
| 2018/0310121 | A1* | 10/2018 | Milton | H04W 4/029 |
| 2018/0338219 | A1* | 11/2018 | Chowdhury | H04W 4/02 |
| 2019/0053189 | A1* | 2/2019 | Ramamurthy | H04B 17/27 |
| 2019/0082287 | A1* | 3/2019 | Froehlich | H04W 4/02 |
| 2019/0098599 | A1* | 3/2019 | Dixon | G06N 5/04 |
| 2020/0065249 | A1* | 2/2020 | Goli | G06N 20/00 |
| 2020/0118031 | A1* | 4/2020 | Reese | G06N 3/044 |
| 2021/0400438 | A1* | 12/2021 | Tran | H04W 4/02 |

OTHER PUBLICATIONS

Mahdizadeh, Mohammad Saleh, and Behnam Bahrak. "A regression framework for predicting userâs next location using call detail records." Computer Networks 183 (2020): 107618. (Year: 2020).*

* cited by examiner

REDUCTION AND GEO-SPATIAL DISTRIBUTION OF TRAINING DATA FOR GEOLOCATION PREDICTION USING MACHINE LEARNING

FIELD OF THE INVENTION

The present technology relates to preparation of a training data set used for machine learning, and more particularly, reduction and geo-spatial distribution of a training data set for geolocation prediction using machine learning.

BACKGROUND OF THE INVENTION

Machine learning (ML) requires a significant amount of data to train. A method for predicting geolocation (GL) of user equipment (UE) when communicating via a cellular communication system is disclosed in copending applications having patent application Ser. Nos. 17/401,059 and 17/401,070, both filed Aug. 12, 2021 and assigned to NetScout Systems Texas, each of which is incorporated herein by reference in its entirety. The method for predicting GL uses truth data which could be global positioning (GPS) reported by the UE, such as by drive tests or Minimization of Driving Test (MDT) data. Only a percentage of UEs are actually enabled to collect and provide truth data that can be gathered for training a ML model. The same UE or cluster of UEs from a similar GL can provide a disproportionate amount of truth data for training purposes. This can result in excessive truth data that is limited to a small geographical area within a cell of the cellular communication network and/or a disproportionate geo-spatial distribution of the truth data. The disproportionate geo-spatial distribution of truth data can introduce bias in the training data.

While such conventional methods and systems for obtaining training data geolocation prediction using machine learning have generally been considered satisfactory for their intended purpose, there is still a need in the art for methods and systems to obtain training data having improved distribution to avoid bias in ML models and to reduce an overall size of training data. The present disclosure provides a solution.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, disclosed is a method for limiting an amount of training data for a machine learning (ML) model. The method includes receiving first configuration parameters including a grid box dimension X and a maximum number of entries per grid box N, wherein X>0. Grids are defined, each of the grids having multiple grid boxes and covering a corresponding geographic area defined by a cell list of a communication network. Each of the grids corresponds to a different cell list, wherein each grid box of a grid covers a different portion of the corresponding geographic area. Call records are received from a control plane in association with user equipment (UE) events for communication by user equipment via the communication network. Truth call records are selected from the call records received that include truth data, wherein the truth data includes reported geolocation (GL) data that indicates a GL at which the call record was generated. For each truth call record, a grid box of the multiple grid boxes is determined that covers a geographic area that includes the GL indicated by the GL data included in the truth call record. The respective truth call records are selectively assigned to the grid box determined for the truth call record in a fashion to not exceed the maximum number of entries per grid box N. The truth data and signal detail data for only the truth call records that are assigned to any of the grid boxes of the multiple grids are output as training data for training the ML model.

In one or more embodiments, selectively assigning the truth call records to the grid box can further include determining whether the maximum number of entries N per grid box has already been assigned the grid box. If it is determined that the grid box has not already been assigned the maximum number of entries N per grid box, the truth call record can be assigned to the grid box. If it is determined that the grid box has already been assigned the maximum number of entries N per grid box, a truth call record that is older than the truth call record and that is already assigned to the grid box can be replaced with the truth call record selected.

In one or more embodiments, the truth call record that was replaced can be an oldest truth call record assigned to the grid box.

In one or more embodiments, the ML model can be further trained with the cell list and the signal detail data of the truth call records that are assigned to any of the grid boxes of the multiple grids.

In one or more embodiments, the method can further include receiving by the ML model input data including a query that includes a cell list and signal detail data of a call record, but does not include truth data, and predicting a GL at which the call record included in the input data was generated, by using call data records as input to the ML model.

In one or more embodiments, the method can further include receiving second configuration parameters including a division parameter Ng and a factor $f$. When defining the grids, the method can further include determining whether a size of a particular geographic area covered by a particular common area defined by one of the cell lists exceeds a threshold. When it is determined that the particular geographical area exceeds the threshold, the method can further include defining a second grid that covers the particular geographic area, and can further include dividing the second grid using the division parameter into multiple second grid boxes and, wherein the amount of second grid boxes can be determined by the division parameter and the second grid boxes have a dimension X1 that is larger than the grid box dimension X, wherein X1>X and a value of X1 is obtained based on a size of the particular geographic area and the division parameter. For each truth call record having a cell list that defines the particular geographic area, the method can further include determining a second grid box of the multiple second grid boxes that covers a geographic area that includes the GL indicated by the GL data included in the truth call record, and instead of selectively assigning the respective truth call records to the grid box determined, selectively assigning the truth call record to the second grid box determined in a fashion to not exceed a new maximum number N1, wherein the new maximum number N1 can be a function of the factor $f$. The truth data and signal detail data for only the truth call records that are assigned to any of the second grid boxes can be output as training data for training the ML model.

In one or more embodiments, the new maximum number N1 can be determined as a function of a ratio R raised to the power $f$, wherein the ratio R is a ratio of the dimension X1 of the second grid boxes and the dimension X of the grid boxes.

In accordance with aspects of the disclosure, a computer system is provided that performs the disclosed method. In accordance with further aspects of the disclosure a non-transitory computer readable storage medium and one or more computer programs embedded therein is provided, which when executed by a computer system, cause the computer system to perform the disclosed method.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

The accompanying appendices and/or drawings illustrate various non-limiting, example, inventive aspects in accordance with the present disclosure.

DETAILED DESCRIPTION OF CERTAIN EMBODIMENTS

Figure 1:
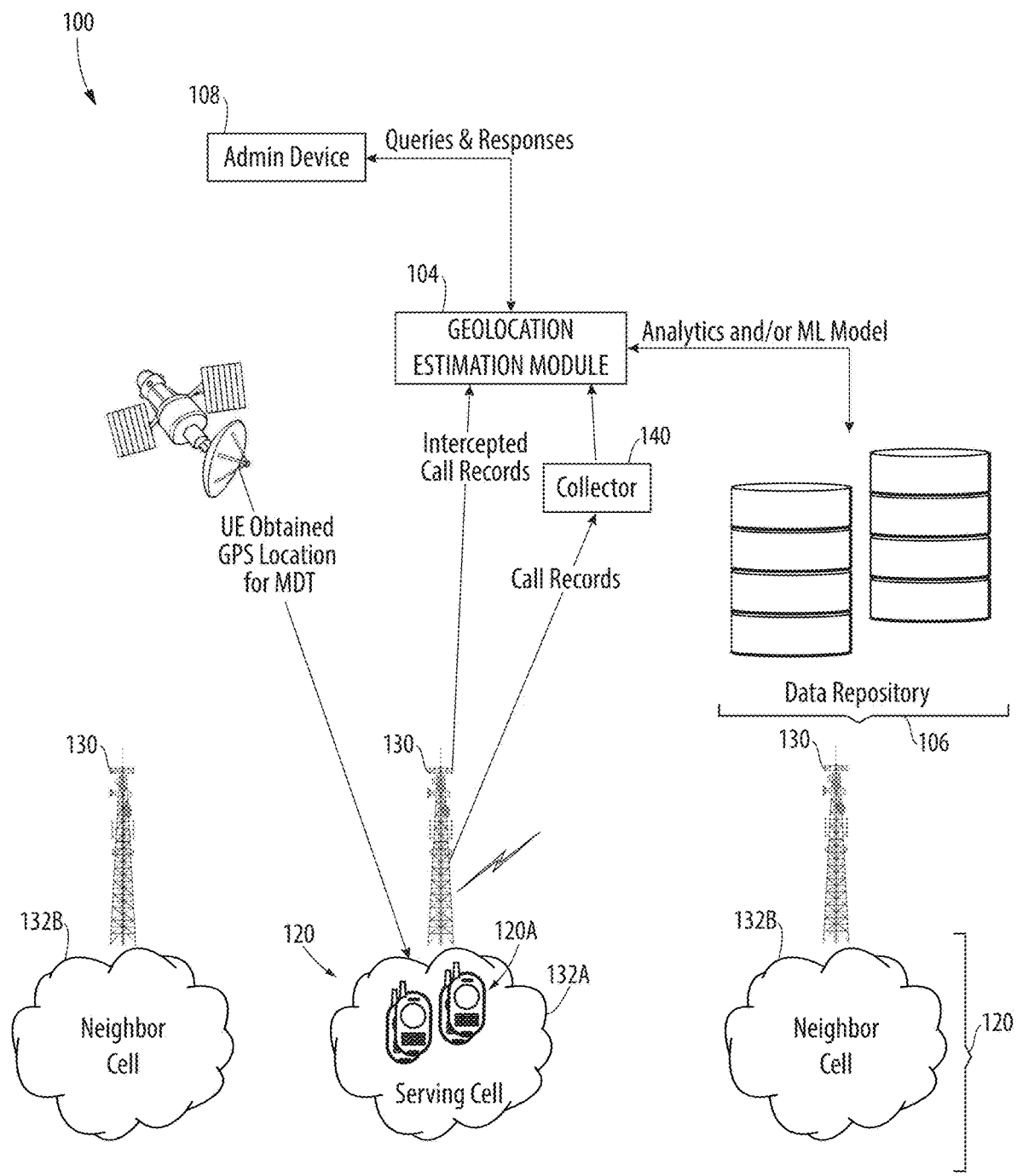
FIG. 1 illustrates a schematic flow diagram of an example geolocation prediction system in accordance with an illustrative embodiment of the present disclosure.

Reference will now be made to the drawings wherein like reference numerals identify similar structural features or aspects of the subject disclosure. For purposes of explanation and illustration, and not limitation, a block diagram of an exemplary embodiment of a cellular communication system in accordance with the disclosure is shown in FIG. 1 and is designated generally by reference character 100. Other embodiments of the cellular communication system in accordance with the disclosure, or aspects thereof, are provided in FIGS. 2-8 as will be described.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth. It is to be appreciated the embodiments of this disclosure as discussed below are implemented using a software algorithm, program, or code that can reside on a computer useable medium for enabling execution on a machine having a computer processor. The machine can include memory storage configured to provide output from execution of the computer algorithm or program.

As used herein, the term "software" is meant to be synonymous with any logic, code, or program that can be executed by a processor of a host computer, regardless of whether the implementation is in hardware, firmware or as a software computer product available on a disc, a memory storage device, or for download from a remote machine. The embodiments described herein include such software to implement the equations, relationships, and algorithms described above. One skilled in the art will appreciate further features and advantages of the disclosure based on the above-described embodiments. Accordingly, the disclosure is not to be limited by what has been particularly shown and described, except as indicated by the appended claims.

Description of certain illustrated embodiments of the present disclosure will now be provided. With reference now to FIG. 1, a block diagram of an exemplary geolocation prediction system 104 included in, or in operative communication with cellular communication 100 is generally shown. The geolocation prediction system 104 illustrates an example of a high level overview of an implementation of an embodiment of the disclosure. Geolocation prediction system 104 estimates a geolocation of one or more user equipment (UE) 120 (referred to individually and collectively as UE 120) communicating via one or more radio access networks (RANs) 130. Geolocation prediction module 104 includes or is in operative communication with a data repository 106 and, optionally, a collector 140.

Geolocation prediction module 104 uses truth data obtained from a percentage of UEs 120 as training data for using machine learning (ML) to predict geolocation (GL) of a UE 120 that does not provide truth data. The truth data can include known location data, such as GPS location data (meaning GPS data or geolocation data determined based on GPS data).

Since the same UE or a cluster of UEs from a similar GL can provide a disproportionate amount of truth data that could be used for training data, there is a risk that training data based on the truth data could be excessive training data for a small geographical area within a cell of the cellular communication system 100. The excess training data can cause a disproportionate geo-spatial distribution of the training data, which can introduce unwanted bias into the training data. In addition, the excess training data adds a processing and storage burden to geolocation prediction module 104 and its associated storage, data repository 106. Accordingly, geolocation prediction module 104 uses the disclosed method to select truth data to be included with the training data in order to improve distribution of the training data to avoid bias in a trained ML model and to reduce an overall amount of the training data.

Cellular communication network 100 is configured for facilitation of cellular communication, such as 3G, 4G, or 5G. Cellular communication network 100, includes a number of RANs 130, each having a cell tower with one or more antennae for receiving and sending signals, thus providing radio coverage for a cell 132. Each of cells 132 can overlap with one or more other cells 132.

Geolocation prediction module 104 includes one or more processing devices that are configured to receive copies of call records associated with call sessions during which a UE 120 communicates via one of RANs 130. The call records can be intercepted from signals propagated to RANs 130 and or intentionally provided to geolocation prediction module 104 or collector 140 of a carrier data center (or service provider) with which geolocation prediction module 104 is affiliated.

A portion of UEs 120 that opted in to communication truth data to collector 140 (e.g., via drive tests or MDT) are shown as participating UEs 120A. Call records to or from participating UEs 120A are provided intentionally to collector 140 with truth data.

Geolocation prediction module 104 can be configured as a server, a desk top, a mobile device, etc. In addition, geolocation prediction module 104 can include or communicate with a probe that intercepts the call sessions. Geolocation prediction module 104 can be affiliated with a carrier data center (meaning included within or having a contractual agreement for sharing data) and receive call records via a collector 140 of the carrier data center. The carrier data center and its collector 140 can be affiliated with a particular carrier service provider or can be neutral, meaning the carrier data center is not affiliated with a particular carrier service provider, but can rather operate with multiple carrier service providers. Carrier data centers can be regulated, depending on the governing jurisdiction, to allow access to control plane data only. Carrier data centers cannot access user plane data in which geolocation information is available. Geolocation information is not available in control plane data. Collector 140 receives call records or GPS location data from call records to collector 140 from participating UEs 120A that have opted into drive test or MDT participation. A participating UE 120A can participate in MDT when, for example, this feature is enabled by a user of the participating UE 120A. Many UEs 120 are provided with an option to enable MDT via carrier data centers or service providers, however typically only a portion of UEs 120 opt in.

Prediction of geolocation of a UE 120 using statistical calculations performed on only control plane data (e.g., Reference Signal Received Power (RSRP), Reference Signal Received Quality (RSRQ), Timing Advance (TA), and other parameters) consumes a large amount of resources, such as processing, memory and time resources. Further complicating determination of geolocation, there has been a transition from use of 3G technology to 4G or 5G technology. 3G technology allows an approximation of geolocation using triangulation based on connection to multiple cells. However, for purposes of conserving power, 4G and 5G technology only connects to a server cell. Power signals from only one tower signal 134 are available, foiling the ability to triangulate using power signals from three or more satellite towers.

Geolocation prediction module 104 is further configured to access data repository 106. Data repository 106 can be included within or external to geolocation prediction module 104. Data repository 106 can be a database, filing system, or other storage means for storing data. Data received by geolocation prediction module 104 can be stored in data repository 106 temporarily or permanently, as well as results of analysis of the data, which can include data structures or models based on results of the analysis.

Geolocation prediction module 104 can also gather data from call records of UEs 120 that did not opt in to provide truth data. These call records can, for example, be intercepted by geolocation prediction module 104 or can be provided to geolocation prediction module 104 by equipment 136 or a carrier data center.

When a UE 120 is participating in a call via RAN 130, a server cell 132A handles exchange of call records having control plane and user plane messages for facilitating the call. One or more neighbor cells 132B can overlap with the server cell 132A. The server cell 132A and neighbor cells 132B can change during the call session, such as due to movement of the UE 120.

A call session can include, for example, a two-way or three-or-more-way (e.g., conference) call with audio and/or video, data, transmission of messages (e.g., short message service (SMS), email, chat, etc.), and/or transmission of graphics, text, audio and/or video files, internet protocol (IP) requests/replies, etc.

Each UE 120 is a cellular device that communicates with one or more other UEs via one or more RANs 130. The UE 120 can be a mobile communication device, such as cellular phone, smart phone, tablet, or a 5G capable sensor, instrument, etc. The UE 120 can include a global positioning satellite (GPS) receiver for communicating with global positioning satellites and trilaterating its location based on geolocation data received from at least three global positioning satellites.

Another example of participating UEs 120A that opted in to communicate truth data includes participating UEs 120A that perform drive tests by being transported through a geographic vicinity and voluntarily share geolocation data (such as GPS location data, triangulation of power signals, or other available sources) with collector 140 as the participating UEs 120A are transported.

An administration device 108 included with or external to geolocation predictor system 100 can be configured to access geolocation prediction module 104, such as to query the geolocation prediction module 104 for a geolocation of an identified UE 120. The administration device 108 can be affiliated or unaffiliated with a carrier data center or service provider that enables or uses the RAN 130. Geolocation prediction module 104 can respond to the queries with a prediction of the requested geolocation. A query can include a call record output by a serving cell while handling a UE's communication or data extracted from the call record, wherein the call record does not include truth data. The query requests a response with a prediction of the GL of the UE.

Geolocation prediction module 104 uses a trained ML model to respond to queries. The query can include a cell list and signal detail data. The cell list identifies the server cell as well as neighbor cells, wherein the neighbor cells are listed in order based on characteristics of signals transmitted by the neighbor cells. Each cell has a unique identifier used by the cellular communication network 100, such as a cell global identity (CGI) or a physical cell identity (PCI). The signal detail data can include, for example, signal strength data and signal timing data that characterize, respectively, strength and timing of the signals associated with communication by the UE when the corresponding call record was generated. The signal detail data can include, for example and without limitation, RSRP, RSRQ and/or TA.

Before responding to queries, the GL prediction module 104 prepares to train the ML model. Preparation for training the ML model includes receiving call records that may or may not include truth data, and further include signal detail data, selecting call records that include truth data, and storing the selected call records in repository 106. Once sufficient call records with truth data are stored, the signal detail data and truth data, and optionally the cell lists, of the stored selected all records are combined and provide as intermediate output that can be used for building the ML model. The ML model is built using the intermediate output and by applying an ML algorithm, such as Random Forest, Linear regression, Lasso, neural algorithms, or any other ML algorithms.

However, the selected call records that have truth data can be from communications with the same UE or a cluster of UEs that are disposed at similar GLs. For example, a UE that opted in can be a busy UE that moves about in a small geographic area, causing generation of a large amount of call records when the UE is in the small geographic area. In another scenario, members of the same family that live in the same apartment or house, or members of the same community that gather at the same venue, may influence one another to opt in. In this scenario, several UEs used in the same geographical area may have opted in. This can result in excessive truth data that is limited to a small geographical area of a cell of the cellular communication system 100 or within a small area of a geographic area defined by a cell list, causing a disproportionate geo-spatial distribution of the truth data. The disproportionate geo-spatial distribution of truth data can introduce unwanted bias in the training data.

GL prediction module 104 is configured to perform additional selections from the selected call records in accordance with the disclosed method to improve geo-spatial distribution of the truth data for reducing or minimizing unwanted bias in the ML model. Advantageously, the additional selection not only improves the training data by reducing or minimizing bias, but further reduces an overall size of the training data, which reduces a burden on resources used to process and/or store the training data.

Figure 2:
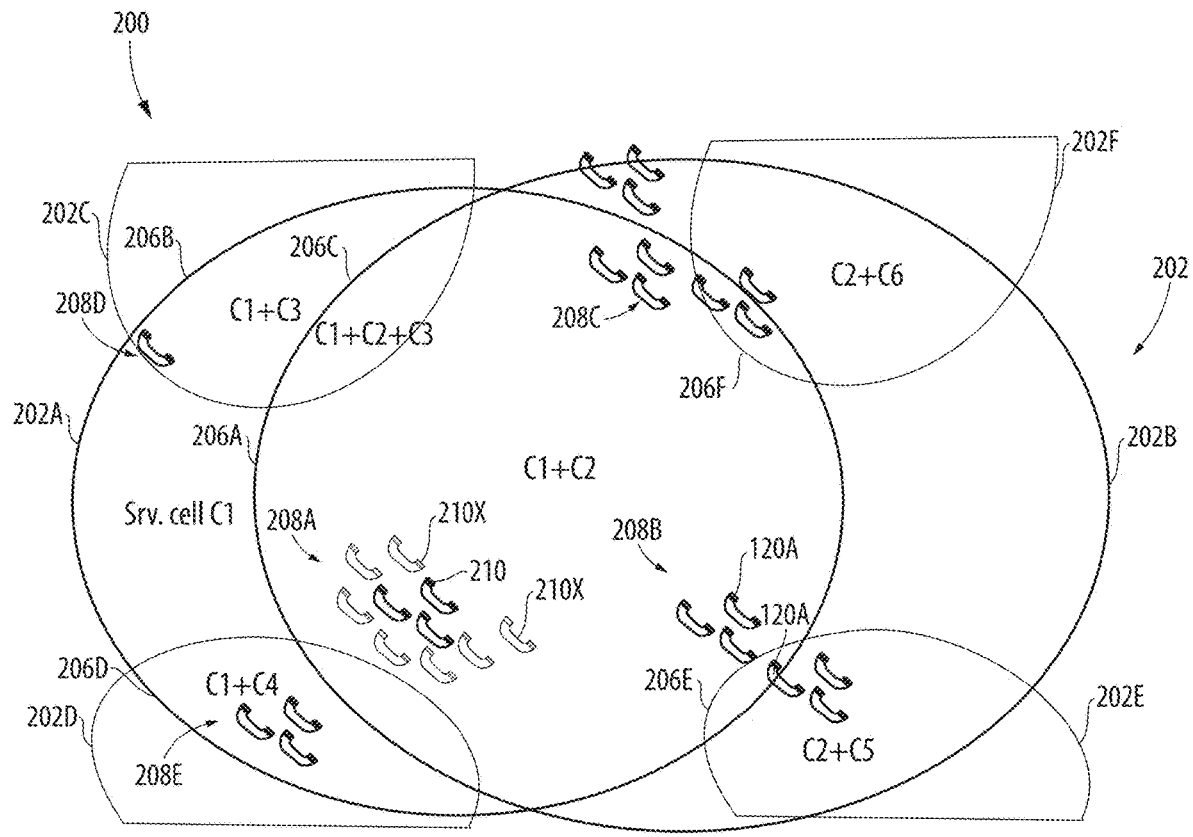
FIG. 2 illustrates a schematic diagram of an example geographic area, example cellular coverage by a cellular communication network having common areas, and example user equipment (UE) disposed in the geographic area, in accordance with an illustrative embodiment of the present disclosure.

With additional reference to FIG. 2, adjustments to distribution of the training data and a reduction of the amount of training data is illustrated. An example geographic area 200 is shown that is provided with radio coverage by a RAN 130. Several cells 202 are provided by RAN 130, shown individually as cells 202A (C1), 202B (C2), 202C (C3), and 202D (C4), 202E (C5), and 202F (C6). Cells 202 can overlap with one another at common areas. Some common areas include portions of three or more cells 202. At any time during a communication with a particular UE 120 while the UE 120 is located in a particular common area, one of the overlapping cells 202 of the common area functions as a server cell for providing service to the UE 120. Other cells 202 overlapping the common area are referred to as neighbor cells. The RANs associated with the neighbor cells transmit signals that can be sensed and sorted into an order based on a signal quality of the sensed signals, such as signal strength. Call records for the communication while UE 120 is in that common area include a cell list that identifies the server cell and the ordered list of neighbor cells.

Each common area 206 has a different cell list. Example common areas 206A, 206B, 206C, 206D, 206E, and 206F are shown with respective cell lists and illustrated with bold outlines. Common area 206A includes overlapping area of C1 and C2 and excludes other common overlapping areas like C1, C2 and C3. The cell list for common area 206A is C1, C2, meaning C1 is the server cell and C2 is the neighbor cell. The cell list for common area 206B is C1, C3, meaning C1 is the server cell and C3 is the neighbor cell. The cell list for common area 206C is C1, C2, C3, meaning C1 is the server cell and C2 and C3 are the neighbor cells, wherein the neighbor cells are ordered based on signal strength. The cell list for common area 206D is C1, C4, meaning C1 is the server cell and C4 is the neighbor cell. The cell list for common area 206E is C1, C2, C5, meaning C1 is the server cell and C2 and C5 are the neighbor cells. The cell list for common area 206F is C1, C2, C6, meaning C1 is the server cell and C2 and C6 are the neighbor cells.

Several clusters 208A, 208B, 208C, 208D, and 208E (referred to generally as clusters 208) having one or more call records with truth data (referred to as truth call records 210) from participating UEs 120A are represented at positions defined by their truth data. Clusters 208A, 208B, and 208C are all at least partially disposed in common area 206A. Truth call records in cluster 208A are all in common area 206A only, are densely clustered, and are spaced from the other clusters 208B, 208C, 208D, and 208E. The dense clustering of truth call records 210 in cluster 208A can cause bias to the training data. The disclosed method mitigates this bias by limiting the number of truth call records 210 that can be closely clustered. Once the allowed limit is reached, each truth call record 210 to be added to a cluster 208 replaces a truth call record 210X (shown with dotted lines) that is now removed from the cluster 208. Truth call records 210 can be added to a cluster 210 without replacing other truth call records 210 until the cluster 208 becomes dense. Clusters 208B, 208C, 208D, and 208E have not yet been determined to be dense and replacements have not occurred for these clusters 208.

Density of clusters 208 can be determined by defining a grid to cover a geographic area defined by a common area that corresponds to a unique cell list. Each grid can be defined, for example, to have multiple grid boxes. Multiple grids can be defined, each of the grids corresponding to a different common area and its cell list. Furthermore, each grid box of a grid defines a different portion of the geographic area defined by the corresponding common area and its cell list. The term "grid" and can refer to a shape (even if it is not shaped as a grid) that is divided (based on a configurable parameter) into multiple units, and the term "grid boxes" can refer to the multiple unit, even if they are not shaped as a box.

Truth call records are selected to be assigned to the appropriate grid boxes in accordance with their truth data in a fashion to not exceed a maximum number N of entries allowed per grid box. Only the truth call records selected are retained in the training data and provided to the ML model for training the ML model, including the truth data and signal data included in the truth call records. Limiting the entries per grid box that can be used by the ML reduces or minimizes bias of the truth data used by the ML model and reduces the overall size of the training data, which reduces burdens on computing resources used by the ML model.

Figure 3:
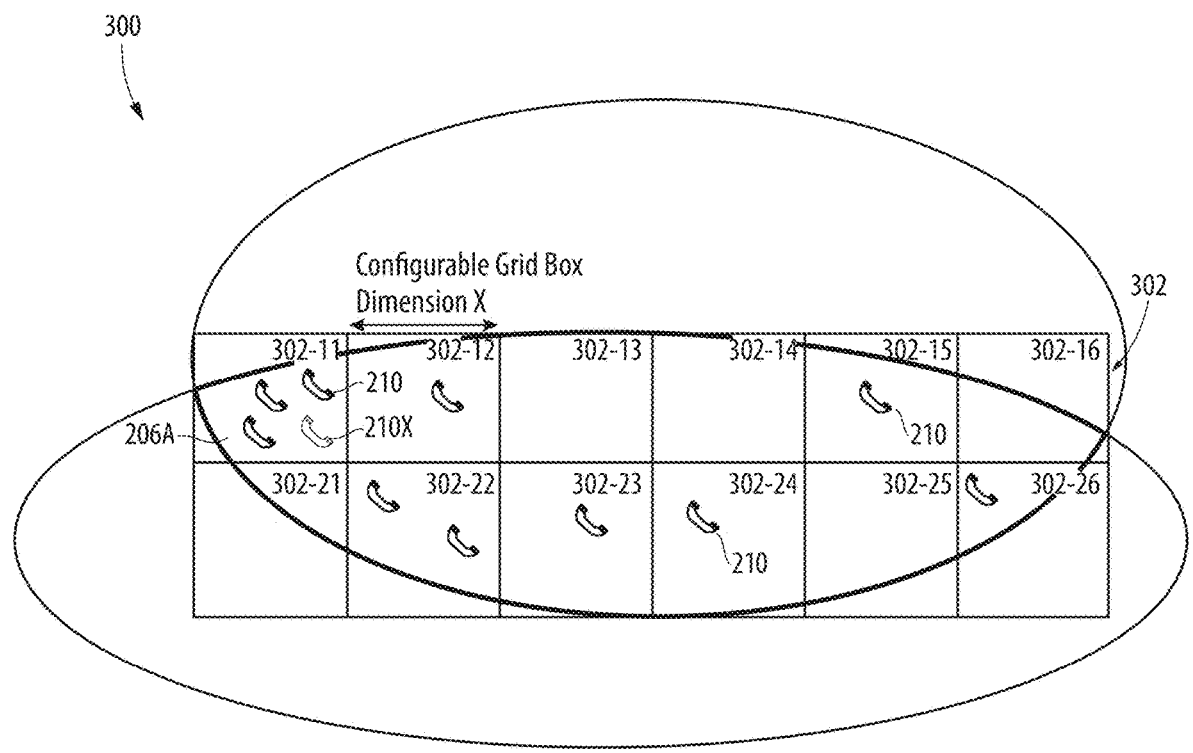
FIG. 3 illustrates a schematic diagram of a grid that corresponds to a geographic area covered by a common area and example UE as assigned or not assigned to grid boxes of the grid, in accordance with an illustrative embodiment of the present disclosure.

FIG. 3 shows a grid 300 having grid boxes 302, wherein grid 300 is defined to cover a geographic area covered by a common area 206A and includes multiple grid boxes. Each grid box 302$ij$ (for column i and row j) covers a different portion of the geographic area. Furthermore, each grid box 302 is defined by at least one dimension X. No more than N truth call records 210 are permitted to be assigned to a single grid box. N and X are configuration data that can be user input, calculated and set by a processing device, or set to a default value.

In the example shown, N=3 and X=10 m. Each grid box 302 is a square having a width of 10 m, and no more than three truth call records 210 are assigned to a grid box 302 at a time. Less than N truth call records 210 are assigned all of the grid boxes 302 shown, except for grid box 302-11. More than N truth call records 210 correspond by their GL to geographic area covered by grid box 302-11, hence a replaced truth call record 210X is replaced by a newly assigned truth call record 210.

In one or more embodiments, the term "grid" can be defined loosely to include multiple contiguous, sometimes overlapping shapes that each cover a different geographic area of a common area. Hence, the disclosure is not limited to a grid that has square grid boxes. The shapes can be defined by more than one dimension (e.g., width, length of a leg or side, height, radius).

For example, in a dense area, such as a suburban area with one or more dense pockets of closely spaced common areas 206 and/or participating UEs 120A, grid 300 can be used to avoid dense clustering within a grid box. Dimension X can be used uniformly for all common areas in the dense area. However in rural areas where the GL or truth call records is typically more dispersed than in a dense area, grid 300 may be less effective for mitigating bias.

For example, when a geographic area covered by a common area 206 is very large, such as can occur in rural areas, a large number of UEs, albeit spread out geographically, can be serviced by the same common area 206A. It may be desirable to further reduce the amount of training data associated with the large geographic area and avoid distribution bias. A large grid can be adapted for usage with a large geographic area covered by the common area 206. Configurable parameters can be used to create and populate the large grid.

Figure 4:
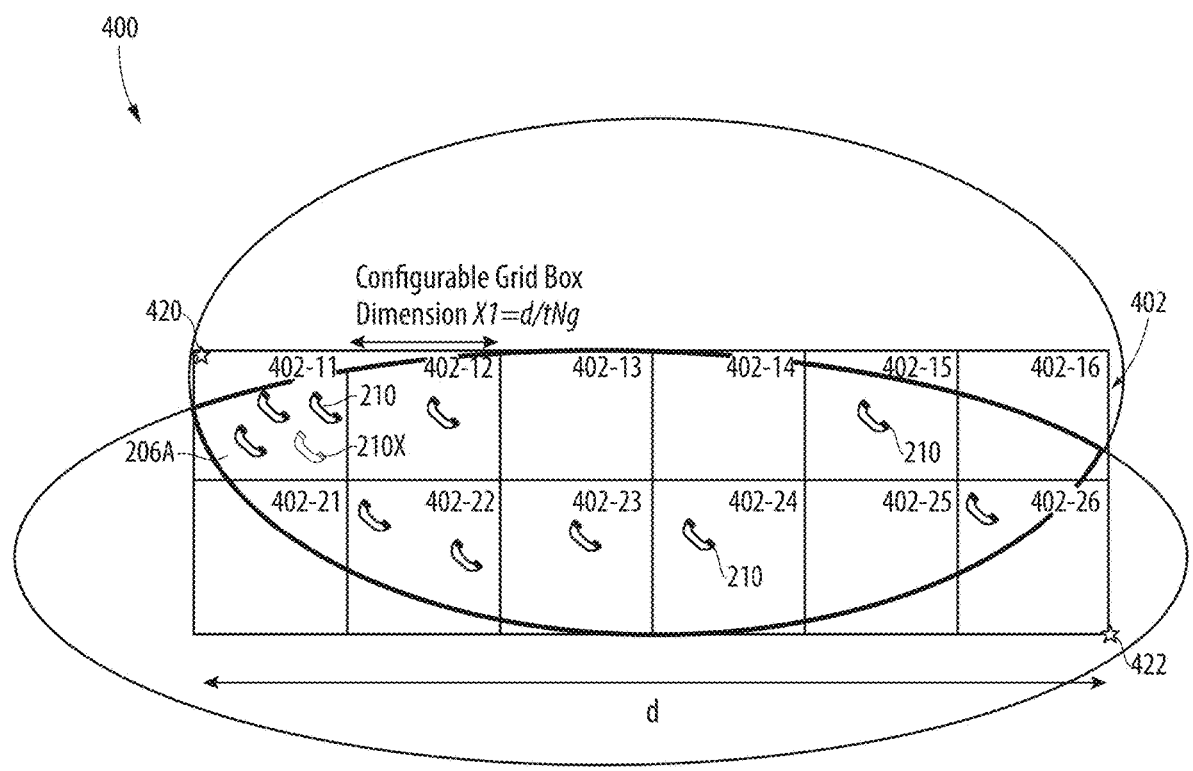
FIG. 4 illustrates a schematic diagram of a second grid that corresponds to a geographic area covered by a large common area and example UE as assigned or not assigned to second grid boxes of the second grid, in accordance with an illustrative embodiment of the present disclosure.

FIG. 4 illustrates an example large second grid 400 that is adapted for usage with large, spread-out (not-dense), geographical areas covered by a large common area 206A. The configurable parameters and configuration and usage of the second grid 400 are provided as an example, without limitation to the particular configurable parameters or configuration of the second grid 400 or its usage.

In the current example, the configurable parameters include X1 or N1 and a factor $f$. N1 defines a number of second grid boxes 402 in second grid 400 along a longest side of a rectangle box that encloses the complete common area and X1 defines a dimension of the second grid boxes 402. X1 and N1 influence one another and can be selected so that X<X1. X1 is defined in accordance with Equation (1):

$$X1 = d/Ng \text{ for } X1 > X, \quad (1)$$

wherein X1 defines at least one dimension of each second grid box 402, and d is a maximum length of the associated common area 206, and Ng is the number used to divide length. Second grid 400 can be rectangular and configured by assigning first and second corners of grid 400, wherein the first and second corners are on opposing ends of a diagonal axis of the rectangle (referred to as diagonally opposing corners). For example, the first corner can be an upper left of the second grid 400 and the second corner can be a lower right corner of the large gird 400.

Once the first and second corners are established, the rectangular area of the second grid 400 can be established based on the first and second corners. In the example shown in FIG. 4, a first corner 420 is assigned coordinates that correspond to a smallest latitude and a smallest longitude of the geographic area covered by the common area 206. A second corner 422 is assigned coordinates that correspond to a largest latitude and a largest longitude of the geographic area covered by the common area 206. The second grid can thus be established with third and fourth corners, which can be positioned, respectively, at the GL having the smallest latitude and the largest longitude, and GL having the largest latitude and the smallest longitude. The second grid is established and configured with a configurable number, Ng, of second grid boxes along second grid 400's longer side, e.g., 10 or 20 second grid boxes. In the example shown, Ng=6.

Truth call records are assigned to the second grid boxes 402 in a fashion to not exceed a maximum number of truth call records allowed per second grid box 402, wherein the maximum number is a function of the factor $f$. Each truth call record is assigned to the second grid box 402 that covers the GL of the truth data in the truth call record. If the maximum number of truth call records has been reached for that second grid box 402, an older truth call record is removed to make room for the new one. The older truth call record that is removed can be the oldest truth call record assigned to the second grid box 402. In this way, older data is removed and the newest data is retained.

In one or more embodiments, the maximum number of truth call records N1 that can be assigned per second grid boxes 402 can be determined in accordance with Equation (2):

$$N1 = N^*(X1/X)^f, \text{ for } X1 > X \text{ and } f > 0 \quad (2)$$

In one or more embodiments, 1.5<$f$<2.

Thus, when using the second grid 400, not only is the distribution of truth call records affected by the increased size of the second grid 400 and its second grid blocks, but the maximum number of truth call records assigned to each second grid box can be adjusted, e.g., increased. Factor $f$ for adjusting the maximum number N is used to raise a ratio of the second grid box dimension: first grid box dimension to a configurable power. Factor $f$ can be constrained as: 1.5<$f$<2 in order to maximize the objective of decreasing a size of the training data.

The truth data and signal detail data of truth call records that are assigned to second grid boxes 402 are provided as training data to the ML model for training the ML model. Usage of truth data or truth data and signal detail data (e.g., RSRP, RSRQ and TA values, etc.) for training the ML model is described in concurrently filed patent application entitled GEOLOCATION PREDICTION FOR RADIO ACCESS NETWORK USER EQUIPMENT, which is assigned to NetScout Systems Texas, and is incorporated by reference herein in its entirety.

Figure 5:
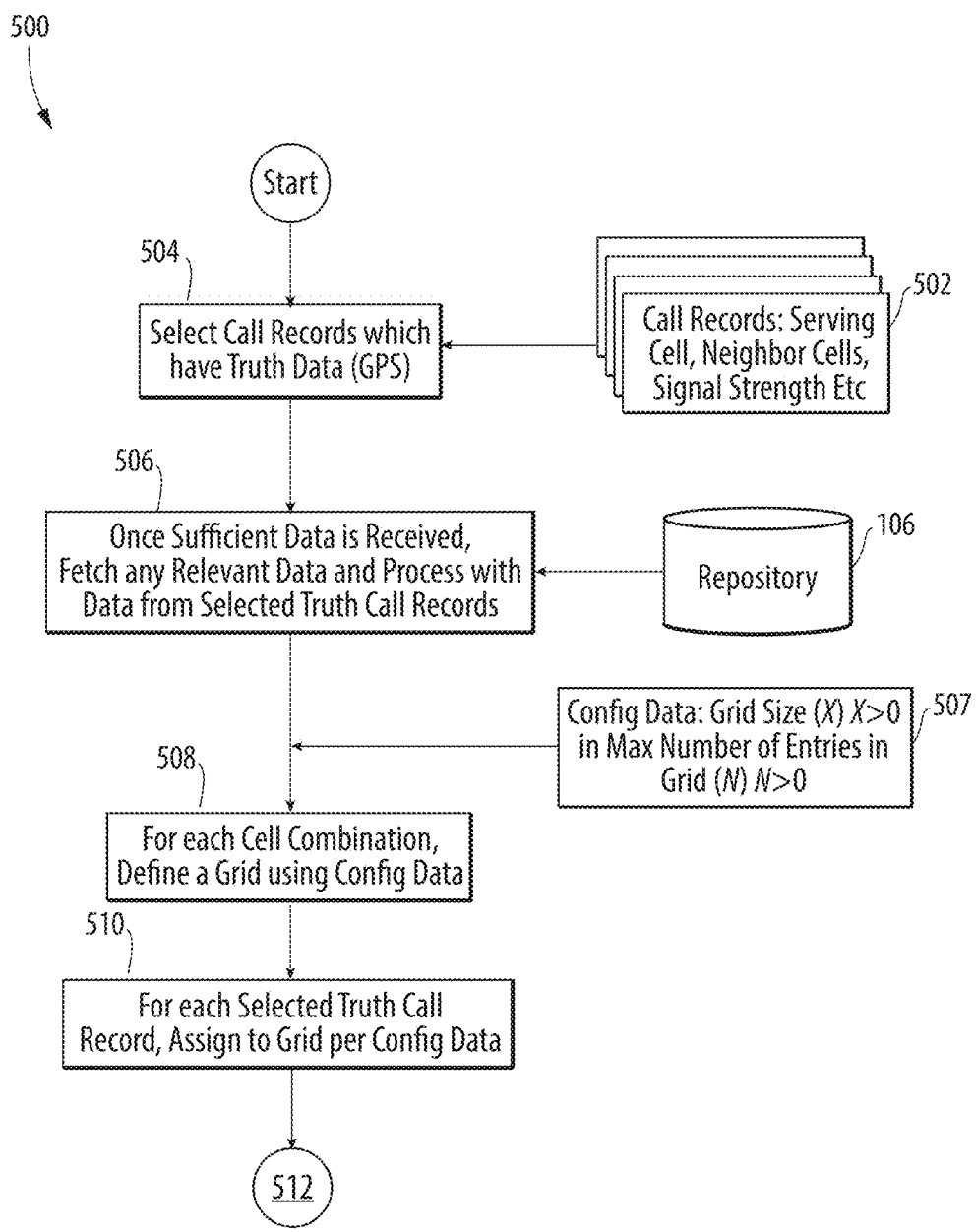
FIG. 5 shows a flow diagram that illustrates an example method for configuring grids and using the grids for selecting training data for training a machine learning (ML), in accordance with an illustrative embodiment of the present disclosure.
Figure 6:
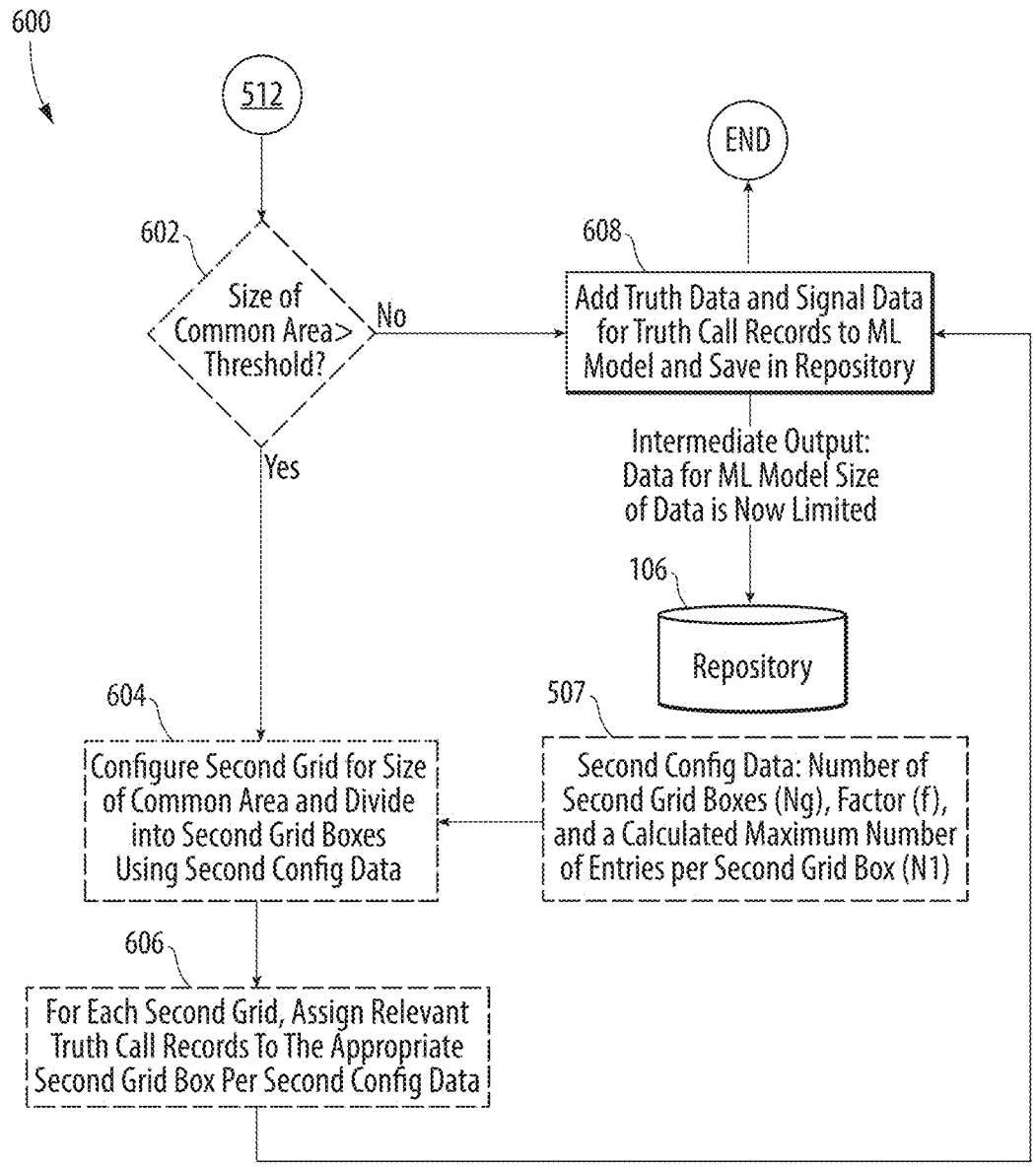
FIG. 6 shows a flow diagram that illustrates a continuation of the flow diagram shown in FIG. 5 with optional blocks for configuring large second grids and using the second grids for selecting training data for training a machine learning (ML), in accordance with an illustrative embodiment of the present disclosure.

FIGS. 5-6 show exemplary and non-limiting flow diagrams illustrating example methods in accordance with certain illustrated embodiments. The methods can be performed by a computing device, such as geolocation prediction module 104 shown in FIG. 1. Before turning to the description of FIGS. 5-6, it is noted that the flow diagrams show examples in which operational blocks are carried out in a particular order, as indicated by the lines connecting the blocks, but the various blocks shown in these flow diagrams can be performed in a different order, or in a different combination or sub-combination. It should be appreciated that in some embodiments some of the blocks described below may be combined into a single block or executed in parallel relative to one another. In some embodiments, one or more additional blocks may be included. In some embodiments, one or more of the blocks can be omitted.

With reference to FIG. 5, a flow diagram 500 is shown that illustrates a method for limiting an amount of training data for a machine learning (ML) model that is trained to predict GL. The method can be performed by a geolocation prediction module, such as geolocation prediction module 104 shown in FIG. 1 during a learning phase that prepares training data for training the ML model. The learning phase can be performed before the ML model is built and deployed for use, and can continue once the ML model has been deployed.

At block 502, call records associated with one or more call sessions are received. The call records include a cell list that identifies a server cell and neighbor cells at the time the call record was generated. The call record further includes data about signal characteristics, such as signal strength and timing information, e.g., RSRP, RSRQ, TA, etc. The term "receive" is intended to be interpreted broadly when used in this sense, and can include receiving or intercepting a transmission, accessing data, reading data, or otherwise obtaining data.

The call records received do not include user plane data and are limited to control plane data. The call records can be sent to or from a UE, such as UEs 120 or 120A shown in FIG. 1. Some of the call records that are truth call records include truth data that was sent from participating UEs, such as UEs 120A shown in FIG. 1. Other call records do not include truth data. The truth data includes measured geolocation (GL) data defining a GL at which the call record was generated.

At block 504, truth call records, meaning call records that include truth data, are selected. Truth data from the truth call records that were selected can be stored, for example, in association with the cell list included in the selected call records. The truth data and cell list associations can be stored as truth data pairs in repository 106. At block 506, once enough truth data pairs are stored, truth data pairs are fetched. Block 506 can be performed for truth data pairs per cell list or for truth data pairs for all selected call records.

At block 508, configuration data stored in a location of memory 507 is accessed. Memory 507 can be volatile or nonvolatile memory included in data repository 106 or can be included in or accessible by geolocation prediction module 104. The configuration data is used to generate a grid for each cell list. The configuration data can include, for example, a dimension X of grid boxes, and a maximum number of entries per grid box, max number N. The grid is defined to cover a geographic area defined by a common area that corresponds to the cell list. Each grid can be defined to have multiple grid boxes that are configured based on dimension X. For example, each grid box can be a square having a width "X."

At block 510, the truth call records are assigned to a grid box of the grid. The grid box is selected for each truth call record is based on the GL defined by the truth call record's truth data. The assignment is made so that the number of truth call records assigned to each grid box do not exceed max number N of the configuration data. The method continues at block 512.

With reference to FIG. 6, a flow diagram 600 is shown that illustrates a continuation of the method shown in FIG. 5. In one or more embodiments, blocks 602, 604, and 606 and the second configuration data stored in memory location 507 are optional blocks that can be omitted, as indicated by the dotted lines. The method continues from block 512. At optional decision block 602, a determination is made whether the geographic area covered by a common area exceeds a predetermined threshold, meaning the geographic area covered by the common area is large, and a different technique can be used to mitigate distribution bias or control the quantity of training data. The method continues at block 608 if the determination at block 602 is that the threshold was not exceeded, or if block 602 is omitted.

At block 608, the truth data and signal detail data included with the truth call records that were selected are added to the ML model and saved in the data repository as intermediate output data, which can be used to train the ML model. The data output at block 608 is used as training data to train the ML model, wherein the amount of training data is limited due to configuration of one or more grids and assignment to one of the grid boxes using the configuration data.

At optional block 604, for each common area that exceeded the threshold, second configuration data stored in a location of memory 507 is accessed. The same second configuration can be used for all common areas that exceed the threshold, or different second configuration can be used for different common areas. The second configuration data is used to generate a second grid for each common area determined at block 602 to exceed the threshold. The second configuration data can include, for example, number of second grid boxes (Ng) along the longest side of the second grid, and a factor ($f$). The second grid can be configured by configuring diagonally-opposing corners of the second grid and forming the second grid based on the diagonally-opposing corners. This forms a rectangular box that encloses the common area. Thus, the second grid is configured to correspond to the geographic area covered by the common area. In one or more embodiments, each second grid box is a square having a dimension X1 (e.g., height and width) defined by (length of the longest side of the rectangle box/the number of second grid boxes (d/Ng)).

At block 606, for each second grid, each relevant truth call record (meaning the truth call record has truth data having a GL included within the geographic area for which the second grid is formed) is assigned to the appropriate second grid box that covers the GL in its truth data. The assignment is made so that the number of truth call records assigned to each second grid box does not exceed a max number N1 computed from the second configuration data, wherein N1 is determined as a function of $f$, e.g., according to Equation (2). This assignment can override any assignments made at block 510. The method continues at block 608.

In one or more embodiments, blocks 602, 604, 606, and 608 are performed before block 508. Blocks 508, 510 are only performed if the determination at block 602 is that the threshold was not exceeded, which is then followed by performance of block 608.

The assignment of truth call records to the grid and/or second grid and intermediate output that used to build the ML model can be updated as the environment and/or location of cells common and areas that correspond to cell lists change. Call records with truth data that reflects the changes to the environment and/or cell locations are processed and used to update the assignments of truth call records to the grid. This provides updated training data over time for continual training of the ML model, which allows ML model to continue to learn and change as the environment and/or geographic area covered by cells and common areas change.

Figure 7:
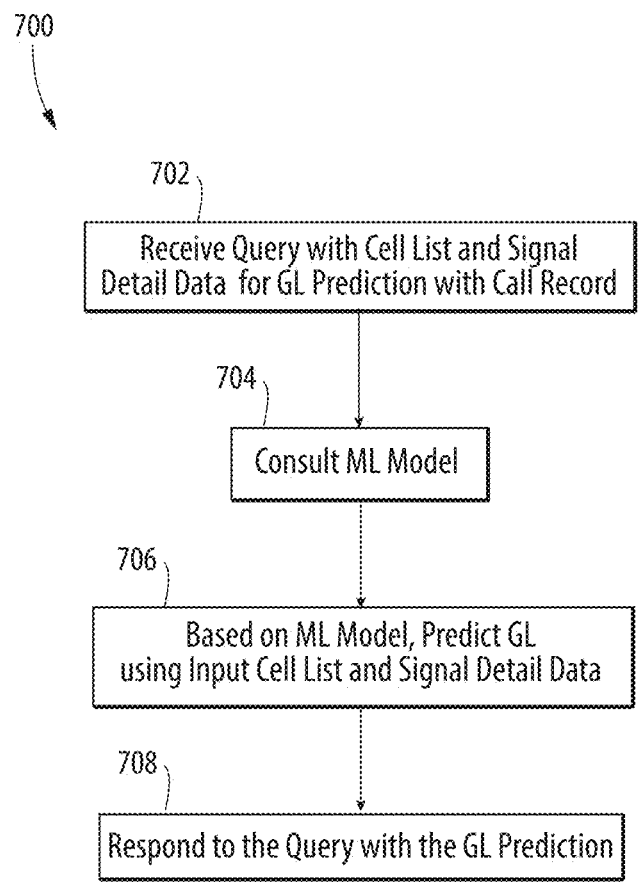
FIG. 7 shows a flow diagram that illustrates an example method for responding to a query for predicting a geolocation (GL) of a UE using the ML model, in accordance with an illustrative embodiment of the present disclosure.

With reference to FIG. 7 a flow diagram 700 is shown that illustrates a method for responding to a query for estimation of a geolocation of a UE, such as UE 120 shown in FIG. 1. The query can be based on call records sent to or from the UE. The call records include control plane information, but do not include truth data. Receipt and response to queries can be performed by a geolocation prediction module, such as geolocation prediction module 104 shown in FIG. 1.

At block 702, a query for a GL prediction using the ML model is received. The query can be received from a processing device, such as administrative device 108 shown in FIG. 1. The processing device can be affiliated with carrier data center or service provider that enables or uses RANs, such as RANs 130, shown in FIG. 1. The query can include a call record or data extracted from the call record, wherein the call record does not include truth data. The signal detail data can include, for example and without limitation, RSRP, RSRQ and/or TA. The query requests a response with a prediction of the GL of the UE.

At block 704 the trained ML model is consulted. In one or more embodiments, ML model can be developed using supervised learning and an ML algorithm, such as random forest, ML based on cell lists, signal detail data (e.g., without limitation, RSRP, RSRQ and/or TA), and truth data associated with selected call records. At block 706, a GL is prediction using the trained ML model using the cell list and signal detail data provided with the query. At block 708, the GL estimate is output in response to the query.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
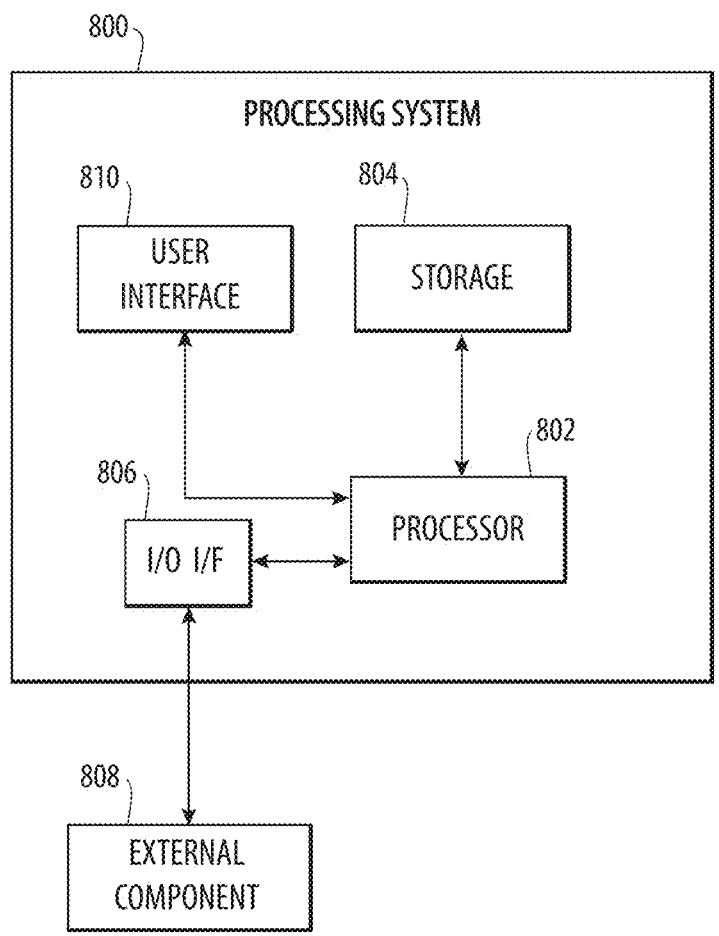
FIG. 8 illustrates a schematic block diagram of an example computer system used by the geolocation prediction system of FIG. 1 for performing the disclosed methods, in accordance with an illustrative embodiment of the present disclosure.

With reference to FIG. 8, a block diagram of an example processing system 800 is shown, which provides an example configuration of a geolocation prediction module 104 embodied in one or more computer systems. One such computer system 800 is illustrated in FIG. 8. In various embodiments, computer system 800 may be a server, a mainframe computer system, a workstation, a network computer, a desktop computer, a laptop, a handheld computer, or the like, and/or include one or more of a field-programmable gate array (FPGA), application specific integrated circuit (ASIC), microcontroller, microprocessor, or the like. Processing system 800 is only one example of a suitable system and is not intended to suggest any limitation as to the scope of use or functionality of embodiments of the disclosure described herein. Processing system 800 can be implemented using hardware, software, and/or firmware. Regardless, processing system 800 is capable of being implemented and/or performing functionality as set forth in the disclosure.

Processing system 800 is shown in the form of a general-purpose computing device. Processing system 800 includes a processing device 802, memory 804, an input/output (I/O) interface (I/F) 806 that can communicate with an internal component, such as a user interface 810, and optionally an external component 808, such as a processing device that submits queries to geolocation prediction module 104 and receives returned responses to the queries.

The processing device 802 can include, for example, a programmable logic device (PLD), microprocessor, DSP, a microcontroller, an FPGA, an ASIC, and/or other discrete or integrated logic circuitry having similar processing capabilities.

The processing device 802 and the memory 804 can be included in components provided in the FPGA, ASIC, microcontroller, or microprocessor, for example. Memory 804 can include, for example, volatile and non-volatile memory for storing data temporarily or long term, and for storing programmable instructions executable by the processing device 802. Memory 804 can be a removable (e.g., portable) memory for storage of program instructions. I/O I/F 806 can include an interface and/or conductors to couple to the one or more internal components, such as user interface 810 and/or external components 808.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational operations to be performed on the computer, other programmable apparatus or other devices to produce a computer implemented process such that the instructions which execute on the computer or other programmable apparatus provide processes for implementing the functions/acts specified in the block diagram block or blocks.

Embodiments of the processing components of geolocation prediction module 104 may be implemented or executed by one or more computer systems, such as a microprocessor. Each computer system 800 can be included within geolocation prediction module 104, or multiple instances thereof. In various embodiments, computer system 800 may include one or more of a microprocessor, an FPGA, application specific integrated circuit (ASIC), microcontroller. The computer system 800 can be provided as an embedded device. Portions of the computer system 800 can be provided externally, such by way of a virtual, centralized, and/or cloud-based computer.

Computer system 800 is only one example of a suitable system and is not intended to suggest any limitation as to the scope of use or functionality of embodiments of the disclosure described herein. Regardless, computer system 800 is capable of being implemented and/or performing any of the functionality set forth hereinabove.

Computer system 800 may be described in the general context of computer system-executable instructions, such as program modules, being executed by a computer system. Generally, program modules may include routines, programs, objects, components, logic, data structures, and so on that perform particular tasks or implement particular abstract data types.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

We claim:

1. A method of limiting an amount of training data for a machine learning (ML) model implemented by a computing system, the method comprising:
 receiving first configuration parameters including a grid box dimension X and a maximum number of entries per grid box N, wherein X>0;

defining grids, each of the grids having multiple grid boxes and covering a corresponding geographic area defined by a cell list of a communication network, each of the grids corresponding to a different cell list, wherein each grid box of a grid covers a different portion of the corresponding geographic area;

receiving call records from a control plane in association with user equipment (UE) events for communication by user equipment via the communication network;

selecting truth call records from the call records received that include truth data, wherein the truth data includes reported geolocation (GL) data that indicates a GL at which the call record was generated;

for each truth call record, determining a grid box of the multiple grid boxes covering a geographic area that includes the GL indicated by the GL data included in the truth call record;

calculating a density metric for each grid box, which quantitatively evaluates a concentration of truth call records assigned to that grid box relative to its geographic area, thereby enabling efficient data management;

selectively assigning the respective truth call records to the grid box determined for the truth call record based on the density metric and in a fashion to not exceed the maximum number of entries per grid box N, wherein the selective assignment control mechanism prevents disproportionate truth data from clustered UEs that could introduce bias;

updating the assignment of truth call records as environment or cell locations change to maintain accurate geographic distribution using re-evaluation algorithms that dynamically respond to environmental changes; and outputting as training data for training the ML model the truth data and signal detail data for only the truth call records that are assigned to any of the grid boxes of the multiple grids;

training a machine learning model using the output truth data and signal detail data to generate a trained model configured to predict geolocation of user equipment based on call records that do not include truth data, wherein the trained model provides improved prediction accuracy through decreased bias and enhanced data processing;

wherein selectively assigning the truth call records leverages optimization techniques to reduce processing and storage requirements and balance geographic distribution of training data;

receiving second configuration parameters including a division parameter Ng and a factor $f$;

when defining the grids:
  determining whether a size of a particular geographic area covered by a particular common area defined by one of the cell lists exceeds a threshold; and
  when determined that the particular geographical area exceeds the threshold:
    defining a second grid that covers the particular geographic area;
    dividing the second grid using the division parameter into multiple second grid boxes and, wherein the amount of second grid boxes is determined by the division parameter and the second grid boxes have a dimension X1 that is larger than the grid box dimension X, wherein X1>X and a value of X1 is obtained based on a size of the particular geographic area and the division parameter;

for each truth call record having a cell list that defines the particular geographic area:
  determining a second grid box of the multiple second grid boxes covering a geographic area that includes the GL indicated by the GL data included in the truth call record; and
  instead of selectively assigning the respective truth call records to the grid box determined, selectively assigning the truth call record to the second grid box determined in a fashion to not exceed a new maximum number N1, wherein the new maximum number N1 is a function of the factor $f$, and outputting as training data for training the ML model the truth data and signal detail data for only the truth call records that are assigned to any of the second grid boxes.

2. The method of claim 1, wherein selectively assigning the truth call records to the grid box further comprises:
  determining whether the maximum number of entries N per grid box has already been assigned the grid box;
  if it is determined that the grid box has not already been assigned the maximum number of entries N per grid box, assigning the truth call record to the grid box; and
  if it is determined that the grid box has already been assigned the maximum number of entries N per grid box, replacing a truth call record that is older than the truth call record and that is already assigned to the grid box with the truth call record selected.

3. The method of claim 2, wherein the truth call record that was replaced is an oldest truth call record assigned to the grid box.

4. The method of claim 1, wherein the ML model is further trained with the cell list and the signal detail data of the truth call records that are assigned to any of the grid boxes of the multiple grids.

5. The method of claim 4, further comprising:
  receiving by the ML model input data including a query that includes a cell list and signal detail data of a call record, but does not include truth data; and
  predicting a GL at which the call record included in the input data was generated, by using call data records as input to the ML model.

6. The method of claim 1, wherein the new maximum number N1 is determined as a function of a ratio R raised to the power $f$, wherein the ratio R is a ratio of the dimension X1 of the second grid boxes and the dimension X of the grid boxes.

7. A system for limiting an amount of training data for a machine learning (ML) model, the system comprising:
  a memory configured to store instructions;
  a processor disposed in communication with the memory, wherein the processor upon execution of the instructions is configured to:
    receive first configuration parameters including a grid box dimension X and a maximum number of entries per grid box N, wherein X>0;
    define grids, each of the grids having multiple grid boxes and covering a corresponding geographic area defined by a cell list of a communication network, each of the grids corresponding to a different cell list, wherein each grid box of a grid covers a different portion of the corresponding geographic area;
    receive call records from a control plane in association with user equipment (UE) events for communication by user equipment via the communication network;
    select truth call records from the call records received that include truth data, wherein the truth data includes reported geolocation (GL) data that indicates a GL at which the call record was generated;
for each truth call record, determine a grid box of the multiple grid boxes covering a geographic area that includes the GL indicated by the GL data included in the truth call record;
calculate a density metric for each grid box, which quantitatively evaluates a concentration of truth call records assigned to that grid box relative to its geographic area, thereby enabling efficient data management;
selectively assign the respective truth call records to the grid box determined for the truth call record based on the density metric and in a fashion to not exceed the maximum number of entries per grid box N, wherein the selective assignment control mechanism prevents disproportionate truth data from clustered UEs that could introduce bias;
update the assignment of truth call records as environment or cell locations change to maintain accurate geographic distribution; and
output as training data for training the ML model the truth data and signal detail data for only the truth call records that are assigned to any of the grid boxes of the multiple grids;
train a machine learning model using the output truth data and signal detail data to generate a trained model configured to predict geolocation of user equipment based on call records that do not include truth data, wherein the trained model provides improved prediction accuracy due to reduced bias in the training data; and wherein selectively assigning the truth call records reduce processing and storage requirements and balance geographic distribution of training data;
receive second configuration parameters including a division parameter Ng and a factor $f$;
when defining the grids:
determine whether a size of a particular geographic area covered by a particular common area defined by one of the cell lists exceeds a threshold; and
when determined that the particular geographical area exceeds the threshold:
define a second grid that covers the particular geographic area;
divide the second grid using the division parameter into multiple second grid boxes and, wherein the amount of second grid boxes is determined by the division parameter and the second grid boxes have a dimension X1 that is larger than the grid box dimension X, wherein X1>X and a value of X1 is obtained based on a size of the particular geographic area and the division parameter;
for each truth call record having a cell list that defines the particular geographic area:
determine a second grid box of the multiple second grid boxes covering a geographic area that includes the GL indicated by the GL data included in the truth call record; and
instead of selectively assigning the respective truth call records to the grid box determined, selectively assign the truth call record to the second grid box determined in a fashion to not exceed a new maximum number N1, wherein the new maximum number N1 is a function of the factor $f$, and output as training data for training the ML model the truth data and signal detail data for only the truth call records that are assigned to any of the second grid boxes.

8. The system of claim 7, wherein selectively assigning the truth call records to the grid box further comprises:
determining whether the maximum number of entries N per grid box has already been assigned the grid box;
if it is determined that the grid box has not already been assigned the maximum number of entries N per grid box, assigning the truth call record to the grid box; and
if it is determined that the grid box has already been assigned the maximum number of entries N per grid box, replacing a truth call record that is older than the truth call record and that is already assigned to the grid box with the truth call record selected.

9. The method of claim 8, wherein the truth call record that was replaced is an oldest truth call record assigned to the grid box.

10. The system of claim 7, wherein the ML model is further trained with the cell list and the signal detail data of the truth call records that are assigned to any of the grid boxes of the multiple grids.

11. The system of claim 10, wherein the processor upon execution of the instructions is further configured to:
receive by the ML model input data including a query that includes a cell list and signal detail data of a call record, but does not include truth data; and
predict a GL at which the call record included in the input data was generated, by using call data records as input to the ML model.

12. The system of claim 7, wherein the new maximum number N1 is determined as a function of a ratio R raised to the power $f$, wherein the ratio R is a ratio of the dimension X1 of the second grid boxes and the dimension X of the grid boxes.

13. A non-transitory computer readable storage medium and one or more computer programs embedded therein, the computer programs comprising instructions, which when executed by a computer system, cause the computer system to:
receive first configuration parameters including a grid box dimension X and a maximum number of entries per grid box N, wherein X>0;
define grids, each of the grids having multiple grid boxes and covering a corresponding geographic area defined by a cell list of a communication network, each of the grids corresponding to a different cell list, wherein each grid box of a grid covers a different portion of the corresponding geographic area;
receive call records from a control plane in association with user equipment (UE) events for communication by user equipment via the communication network;
select truth call records from the call records received that include truth data, wherein the truth data includes reported geolocation (GL) data and GPS location data that indicates a GL at which the call record was generated;
for each truth call record, determine a grid box of the multiple grid boxes covering a geographic area that includes the GL indicated by the GL data included in the truth call record;
calculate a density metric for each grid box, which quantitatively evaluates a concentration of truth call records assigned to that grid box relative to its geographic area, thereby enabling efficient data management;

selectively assign the respective truth call records to the grid box determined for the truth call record based on the density metric and in a fashion to not exceed the maximum number of entries per grid box N, wherein the selective assignment control mechanism prevents disproportionate truth data from clustered UEs that could introduce bias;

update the assignment of truth call records as environment or cell locations change to maintain accurate geographic distribution; and output as training data for training the ML model the truth data and signal detail data for only the truth call records that are assigned to any of the grid boxes of the multiple grids;

train a machine learning model using the output truth data and signal detail data to generate a trained model configured to predict geolocation of user equipment based on call records that do not include truth data, wherein the trained model provides improved prediction accuracy due to reduced bias in the training data; and wherein selectively assigning the truth call records leverages optimization techniques to reduce processing and storage requirements and balance geographic distribution of training data;

receive second configuration parameters including a division parameter Ng and a factor $f$;

when defining the grids:
- determine whether a size of a particular geographic area covered by a particular common area defined by one of the cell lists exceeds a threshold; and
- when determined that the particular geographical area exceeds the threshold:
  - define a second grid that covers the particular geographic area;
  - divide the second grid using the division parameter into multiple second grid boxes and, wherein the amount of second grid boxes is determined by the division parameter and the second grid boxes have a dimension X1 that is larger than the grid box dimension X, wherein X1>X and a value of X1 is obtained based on a size of the particular geographic area and the division parameter;
  - for each truth call record having a cell list that defines the particular geographic area:
    - determine a second grid box of the multiple second grid boxes covering a geographic area that includes the GL indicated by the GL data included in the truth call record; and
    - instead of selectively assigning the respective truth call records to the grid box determined, selectively assign the truth call record to the second grid box determined in a fashion to not exceed a new maximum number N1, wherein the new maximum number N1 is a function of the factor $f$, and output as training data for training the ML model the truth data and signal detail data for only the truth call records that are assigned to any of the second grid boxes.

14. The non-transitory computer readable storage medium of claim 13, wherein selectively assigning the truth call records to the grid box further comprises:
- determining whether the maximum number of entries N per grid box has already been assigned the grid box;
- if it is determined that the grid box has not already been assigned the maximum number of entries N per grid box, assigning the truth call record to the grid box; and
- if it is determined that the grid box has already been assigned the maximum number of entries N per grid box, replacing a truth call record that is older than the truth call record and that is already assigned to the grid box with the truth call record selected.

15. The non-transitory computer readable storage medium of claim 13, wherein the ML model is further trained with the cell list and the signal detail data of the truth call records that are assigned to any of the grid boxes of the multiple grids.

16. The non-transitory computer readable storage medium of claim 15, wherein the computer programs, when executed by a computer system, further causes the computer system to:
- receive by the ML model input data including a query that includes a cell list and signal detail data of a call record, but does not include truth data; and
- predict a GL at which the call record included in the input data was generated, by using call data records as input to the ML model.

17. The non-transitory computer readable storage medium of claim 13, wherein the new maximum number N1 is determined as a function of a ratio R raised to the power $f$, wherein the ratio R is a ratio of the dimension X1 of the second grid boxes and the dimension X of the grid boxes.

* * * * *